US012284695B2

(12) United States Patent
Walldeen et al.

(10) Patent No.: US 12,284,695 B2
(45) Date of Patent: Apr. 22, 2025

(54) FUNCTIONAL PART SELECTION IN A DISAGGREGATED BASE STATION

(71) Applicant: Telefonaktiebolaget LM Ericsson (publ), Stockholm (SE)

(72) Inventors: Thomas Walldeen, Linköping (SE); Stefan Eng, Linköping (SE); Torbjörn Örtengren, Linköping (SE)

(73) Assignee: Teleonaktiebolaget LM Ericsson (Publ), Stockholm (SE)

( * ) Notice: Subject to any disclaimer, the term of this patent is extended or adjusted under 35 U.S.C. 154(b) by 690 days.

(21) Appl. No.: 17/425,789

(22) PCT Filed: Feb. 13, 2020

(86) PCT No.: PCT/EP2020/053759
§ 371 (c)(1),
(2) Date: Jul. 26, 2021

(87) PCT Pub. No.: WO2020/165343
PCT Pub. Date: Aug. 20, 2020

(65) Prior Publication Data
US 2022/0183089 A1 Jun. 9, 2022

Related U.S. Application Data

(60) Provisional application No. 62/806,303, filed on Feb. 15, 2019.

(51) Int. Cl.
*H04W 76/12* (2018.01)
*H04W 88/08* (2009.01)

(52) U.S. Cl.
CPC .......... *H04W 76/12* (2018.02); *H04W 88/085* (2013.01)

(58) Field of Classification Search
CPC ... H04W 76/12; H04W 88/085; H04W 88/14; H04W 92/24
See application file for complete search history.

(56) References Cited

U.S. PATENT DOCUMENTS 9,271,202 B2 * 2/2016 Zhang ................... H04W 40/24
10,708,968 B2 * 7/2020 Kim ....................... H04W 76/12
(Continued)

OTHER PUBLICATIONS

International Search Report in PCT/EP2020/053759 dated May 26, 2020, 3 pages.
(Continued)

*Primary Examiner* — Hassan A Phillips
*Assistant Examiner* — Prenell P Jones
(74) *Attorney, Agent, or Firm* — Weisberg I.P. Law. P.A.

(57) ABSTRACT

The invention refers to a method performed by a control plane, CP, functional part (415) of a base station, the method comprising establishing a transport network layer, TNL, association with a network function (440B) that supports a plurality of user plane, UP, functional parts of first base station; transmitting to the network function a request message (701) comprising information for selecting a first UP functional part among the plurality of UP functional parts; and receiving, in response to the request message, a response message (703) transmitted by the network function, wherein the response message comprises an identifier of the first UP functional part. The invention further refers to corresponding methods performed by the UP functional part, the network function, and to a corresponding base station.

34 Claims, 19 Drawing Sheets

1400

1410
transmitting a first message comprising information uniquely identifying a first UP towards a VNF, wherein the VNF comprises the first UP associated with a first IP address and a second UP associated with the first IP address 1420
receiving, in response to the first message, a second message from the first UP establishing a connection

(56) References Cited

U.S. PATENT DOCUMENTS

| | | | | |
|---|---|---|---|---|
| 10,757,615 B2* | 8/2020 | Park | ...................... | H04W 76/19 |
| 11,533,651 B2* | 12/2022 | Liu | ..................... | H04W 88/085 |
| 11,596,012 B2* | 2/2023 | Xu | ....................... | H04W 88/085 |
| 2018/0368109 A1* | 12/2018 | Kim | ....................... | H04W 72/04 |
| 2019/0059027 A1* | 2/2019 | Yang | ................. | H04W 36/0064 |
| 2020/0178326 A1* | 6/2020 | Sirotkin | ................ | H04W 76/12 |
| 2021/0306848 A1* | 9/2021 | Chen | ..................... | H04W 76/18 |

OTHER PUBLICATIONS

Huawei, "(TP for NR BL CR for T5 38.463) on PLMN over E1C non-UE associated signaling." 3GPP TSG-RAN WG3 #101, Gothenburg, Sweden, Aug. 20-24, 2018, R3-185092, 16 pages.

* cited by examiner

FUNCTIONAL PART SELECTION IN A DISAGGREGATED BASE STATION

CROSS REFERENCE TO RELATED APPLICATION(S)

This application is a 35 U.S.C. § 371 National Stage of International Patent Application No. PCT/EP2020/053759, filed Feb. 13, 2020, claiming benefit from provisional U.S. Patent Application No. 62/806,303, filed Feb. 15, 2019, designating the United States.

TECHNICAL FIELD

This disclosure generally relates to a disaggregated base station, and more specifically relates to establishment of interface links between functional parts of the base station.

BACKGROUND

3GPP is currently standardizing the 5G Core Network as part of the overall 5G System architecture. FIG. 1 illustrates a 5G network architecture. The 5G network architecture shown in FIG. 1 comprises a plurality of user equipment (UEs) 110a-g (i.e., any device capable of wirelessly communicating with an access network, including smartphones, smart appliances, sensors, and other Internet-of-Things (IoT) devices) connected to a base station 105, e.g. such as evolved Node Bs (eNBs) or 5G base stations (gNBs) or similar.

The current 3GPP specification specifies an architecture where a gNodeB within an NG RAN comprises a Central Unit (gNB-CU) and one or more Distributed Units (gNB-DUs). The CU can in its turn be divided into a CU Control Plane (gNB-CU-CP) part 115 and one or more CU User Plane parts (gNB-CU-UPs) 120a-n. In many respects, the 5G core network aims at separating user plane (UP) 120 and control plane (CP) 115. Separating the user and control planes helps each plane resource to be scaled independently. It also allows user plane functions to be deployed separately from control plane functions in a distributed fashion. In this architecture, UPFs may be deployed very close to UEs to shorten the Round Trip Time (RTT) between UEs and data network for some applications requiring low latency.

3GPP also defines the O&M view of this system, where each of the logical nodes gNB-CU-CP, gNB-CU-UP, and gNB-DU can be configured by a corresponding managed function, namely GNBCUCPFunction, GNBCUUPFunction and GNBDUFunction, respectively.

The current specification implies that there may be only be one gNB-CU-UP per IP address when initiating the E1 interface from the gNB-CU-CP. That is, the application protocol (E1AP) currently does not provide or an identify of which gNB-CU-UP is addressed amongst a plurality of gNB-CU-UPs per IP address. According to 3GPP TS 28.541, the gNB-CU-UP may have a preconfigured gNB identity (and gNB identity length), and therefore it may be required to select the correct gNB-CU-UP. The current virtual packet processing (vPP) product requires that a number of processor cores are used together in order to support a number of gNB-CU-UPs and be able to provide the required performance with a reasonable footprint. This cannot be achieved, however, unless a unique IP address is allocated per gNB-CU-UP.

Additionally, there is a problem in selecting a correct gNB-CU-CP if the E1 interface is instead initiated from the gNB-CU-UP. For example, if several gNB-CU-CPs are realized such they share the same IP address, then extra information must be configured in the gNB-CU-CP by the operator in order to be able to connect the gNB-CU-UP to the correct gNB-CU-CP.

SUMMARY

In an embodiment, a method performed by a control plane, CP, functional part of a first base station comprises establishing an association, e.g. a transport network layer, TNL, association with a network function that supports a plurality of user plane, UP, functional parts of the first base station; transmitting to the network function a request message comprising information for selecting a first UP functional part among the plurality of UP functional parts; and receiving, in response to the request message, a response message transmitted by the network function, wherein the response message comprises an identifier of the first UP functional part.

In an embodiment, a method performed by a network function that supports a plurality of user plane, UP, functional parts of a first base station the method comprises establishing an association (e.g. a transport network layer, TNL, association) with a control plane, CP, functional part of the first base station; receiving from the CP functional part of the first base station a request message, wherein the request message comprises information for selecting a first UP functional part among the plurality of functional parts of the first base station; selecting the first UP functional part of the first base station using the information identifying the first UP functional part of the first base station; and transmitting, in response to the request message, a response message to the CP functional part of the first base station, wherein the response message comprises an identifier of the first UP functional part of the first base station.

In an embodiment, a method performed by a user plane, UP, functional part of a first base station comprises establishing an association (e.g. a transport network layer, TNL, association) with a network function that supports at least a first control plane, CP, functional part of the first base station; transmitting to the network function a request message comprising information for identifying the first control plane, CP, functional part of the first base station; and, receiving, in response to the request message, a response message transmitted by the network function, wherein the response message comprises an identifier of the first CP functional part of the first base station.

In an embodiment, a method performed by a network function that supports at least a first control plane, CP, functional part of a first base station comprises establishing a transport network layer, TNL, association with a user plane, UP, functional part of the first base station; receiving, a request message (1301) transmitted by the UP functional part of the first base station, wherein the request message comprises information for is selecting the first CP functional part of the first base station; selecting the first CP functional part of the first base station using the information identifying the first CP functional part of the first base station; and transmitting a response message to the UP functional part of the first base station, wherein the response message comprises an identifier of the first CP functional part of the base station.

According to some embodiments, when the E1 interface is initiated from the gNB-CU-CP, the needed information may be provided in the interface establishment protocol in order to identify the correct gNB-CU-UP for selection where there are multiple gNB-CU-UPs per IP address.

According to some embodiments, when the E1 interface is initiated from the gNB-CU-UP, the needed information may be provided in the interface establishment protocol in order to identify the correct gNB-CU-CP for selection where there are multiple gNB-CU-CPs per IP address without adding any specific new information to be pre-configured in the gNB-CU-CP.

BRIEF DESCRIPTION OF THE DRAWINGS

The accompanying drawings, which are incorporated herein and form part of the specification, illustrate various embodiments.

DETAILED DESCRIPTION

Figure 1:
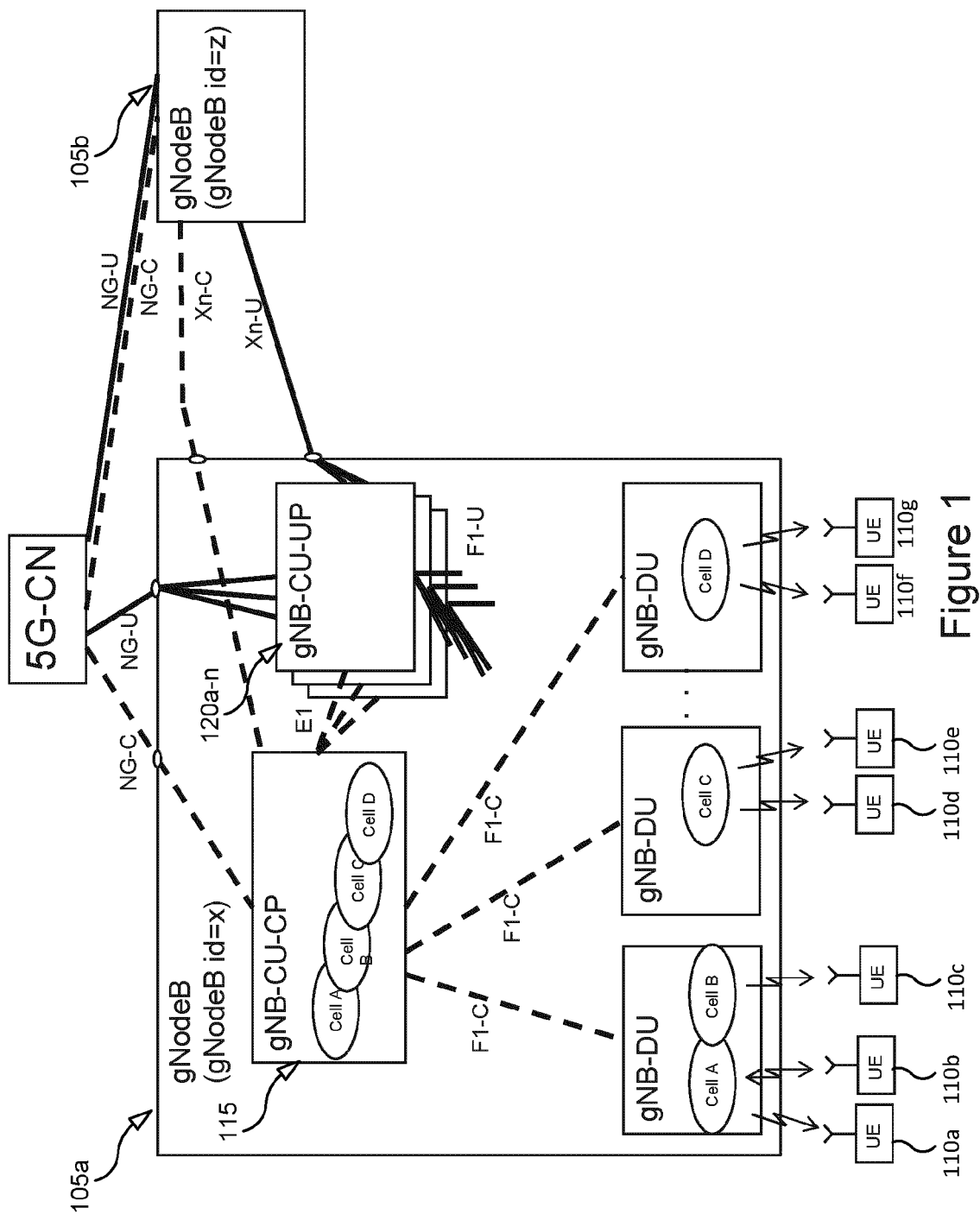
FIG. 1 illustrates a network architecture according to some embodiments.

Some embodiments described herein enable a virtualized network function (VNF) to support a number of gNB-CU-UPs using the same IP address when the E1 interface is initiated from the gNB-CU-CP. Allowing a VNF to support multiple gNB-CU-Ups with the same IP address provides a technological improvement when realizing a network because it avoids the need to add more IP addresses dynamically to the VNF as well as an excessive usage of IP addresses, which are considered big problems by network operators.

By way of background, 3GPP TS 38.463 E1AP, which is incorporated herein by reference in its entirety, describes a gNB-CU-CP E1 setup procedure designed to exchange application level data needed for the gNB-CU-CP and the gNB-CU-UP to correctly interoperate on the E1 interface. The gNB-CU-CP initiates the procedure by sending a GNB-CU-CP E1 SETUP REQUEST message including the appropriate data to the gNB-CU-UP. The gNB-CU-UP responds with a GNB-CU-CP E1 SETUP RESPONSE message including the appropriate data. According to the current specification, TS 38.463, section 9.2.1.7, the GNB-CU-CP E1 SETUP REQUEST message may include the following elements shown in Table 1:

TABLE 1

| IE/Group Name | Presence | Range | IE type and reference | Semantics description | Criticality | Assigned Criticality |
| --- | --- | --- | --- | --- | --- | --- |
| Message Type | M | | 9.3.1.1 | | YES | reject |
| Transaction ID | M | | 9.3.1.53 | | YES | reject |
| gNB-CU-CP Name | O | | Printable-String(SIZE (1 . . . 150, . . . )) | Human readable name of the gNB-CU-CP. | YES | ignore |

According to one embodiment, the E1 initiating message GNB-CU-CP E1 Setup Request is extended with data to uniquely identify the gNB-CU-UP instance. This can be gNB identity, gNB identity length, and optionally the gNB-CU-UP identity. These identity elements are described in 3GPP TS 38.463 E1AP, which is incorporated herein by reference in its entirety.

According to another embodiment, the orchestration and management (O&M) interface described in 3GPP TS 28.541 is extended to configure an "expected CUCP name" for a gNB-CU-UP.

Additional embodiments described herein support E1 setup initiated from a gNB-CU-UP without requiring any extra configuration data needed in the gNB-CU-CP, thereby enabling a VNF to support a multiple number of gNB-CU-CPs sharing the same IP address.

By way of background, TS 38.463 describes that the purpose of the gNB-CU-UP E1 Setup procedure is to exchange application level data needed for the gNB-CU-UP and the gNB-CU-CP to correctly interoperate on the E1 interface. The gNB-CU-UP initiates the procedure by sending a GNB-CU-UP E1 SETUP REQUEST message including the appropriate data to the gNB-CU-CP. The gNB-CU-CP responds with a GNB-CU-UP E1 SETUP RESPONSE message including the appropriate data. According to the current specification, TS 38.463, section 9.2.1.4, the GNB-CU-UP E1 SETUP REQUEST message includes the following elements shown in Table 2:

TABLE 2

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.53 | | YES | reject |
| gNB-CU-UP ID | M | | 9.3.1.15 | | YES | reject |
| gNB-CU-UP Name | O | | PrintableString(SIZE (1 . . . 150, . . . )) | Human readable name of the gNB-CU-UP. | YES | ignore |
| CN Support | M | | ENUMERATED (EPC. 5GC, both, . . . ) | | YES | reject |
| Supported PLMNs | | 1 . . . <maxnoofSPLMNs> | | Supported PLMNs | YES | Reject |
| >PLMN Identity | M | | 9.3.1.7 | | — | — |
| >Slice Support List | O | | 9.3.1.8 | Supported S-NSSAIs. | — | — |
| >NR CGI Support List | O | | 9.3.1.36 | Supported cells. | — | — |
| >QoS Parameters Support List | O | | 9.3.1.37 | Supported QoS parameters. | — | — |
| gNB-CU-UP Capacity | O | | 9.3.1.56 | | YES | ignore |

According to some embodiments, the E1 initiating message gNB-CU-UP E1 Setup Request is extended with data already existing in the gNB-CU-CP to allow unique identification of which gNB-CU-CP the gNB-CU-UP wants to connect. In some embodiments, this data may include the gNB identifier and gNB id length already existing in the gNB-CU-CP, which may allow unique identification of the gNB-CU-CP. Such a solution avoids having to add additional data to the gNB-CU-CP, such as the attributes gNB-CU-UP Id and gNB-CU-UP Name, which may need to be configured manually.

According to some embodiments, data that is already in the gNB-CU-CP and sufficient to identify a correct gNB-CU-UP is provided in the E1AP protocol in order to allow a VNF to select the correct gNB-CU-UP when establishing the E1 interface. The establishment of the E1 interface may be performed via the application protocol E1AP using the message GNB-CU-CP E1 Setup Request.

Figure 2:
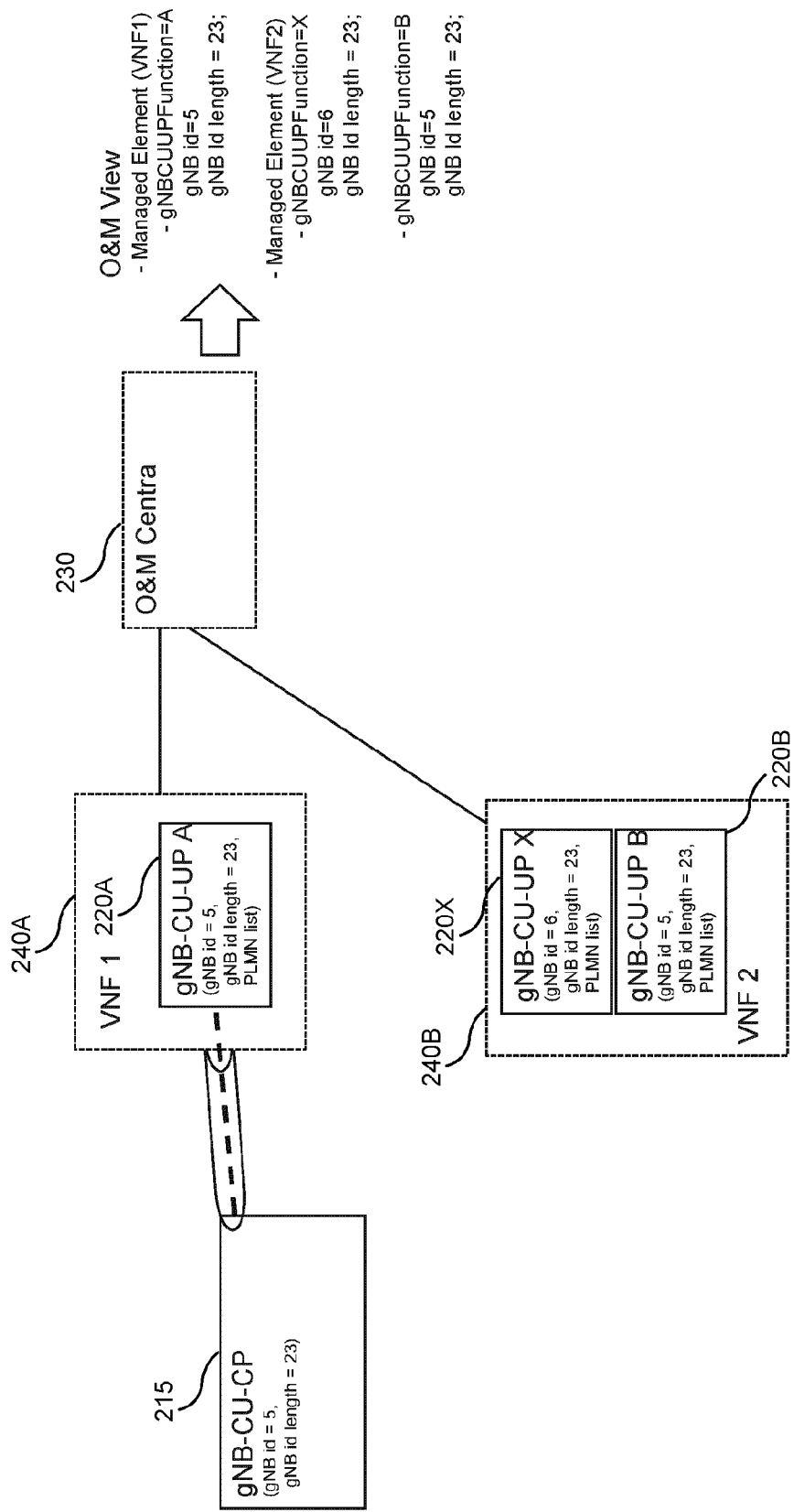
FIG. 2 illustrates a communication system and flow according to some embodiments.

FIG. 2 illustrates a communication system and flow according to some embodiments. A certain gNodeB is made up via one gNB-CU-CP, one gNB-CU-UP, and a number of gNB-DUs (gNB-DUs are not shown in FIG. 2). FIG. 2 depicts a communication system with a gNB-CU-CP 215 logical node and gNB-CU-UP logical nodes 220A, 220B, 220X realized in the cloud by certain types of VNFs 240A-B (VNF1, VNF2). Each VNF 240A-B can support one or more gNB-CU-UPs (gNB-CU-UP A, gNB-CU-UP X, gNB-CU-UP B). As shown in FIG. 2, the gNB-CU-UP A 220A is realized by the VNF 1, 240A, and is coupled with gNB-CU-CP 215 for a specific gNB (gNB id=5, gNB Id length=23).

Figure 3:
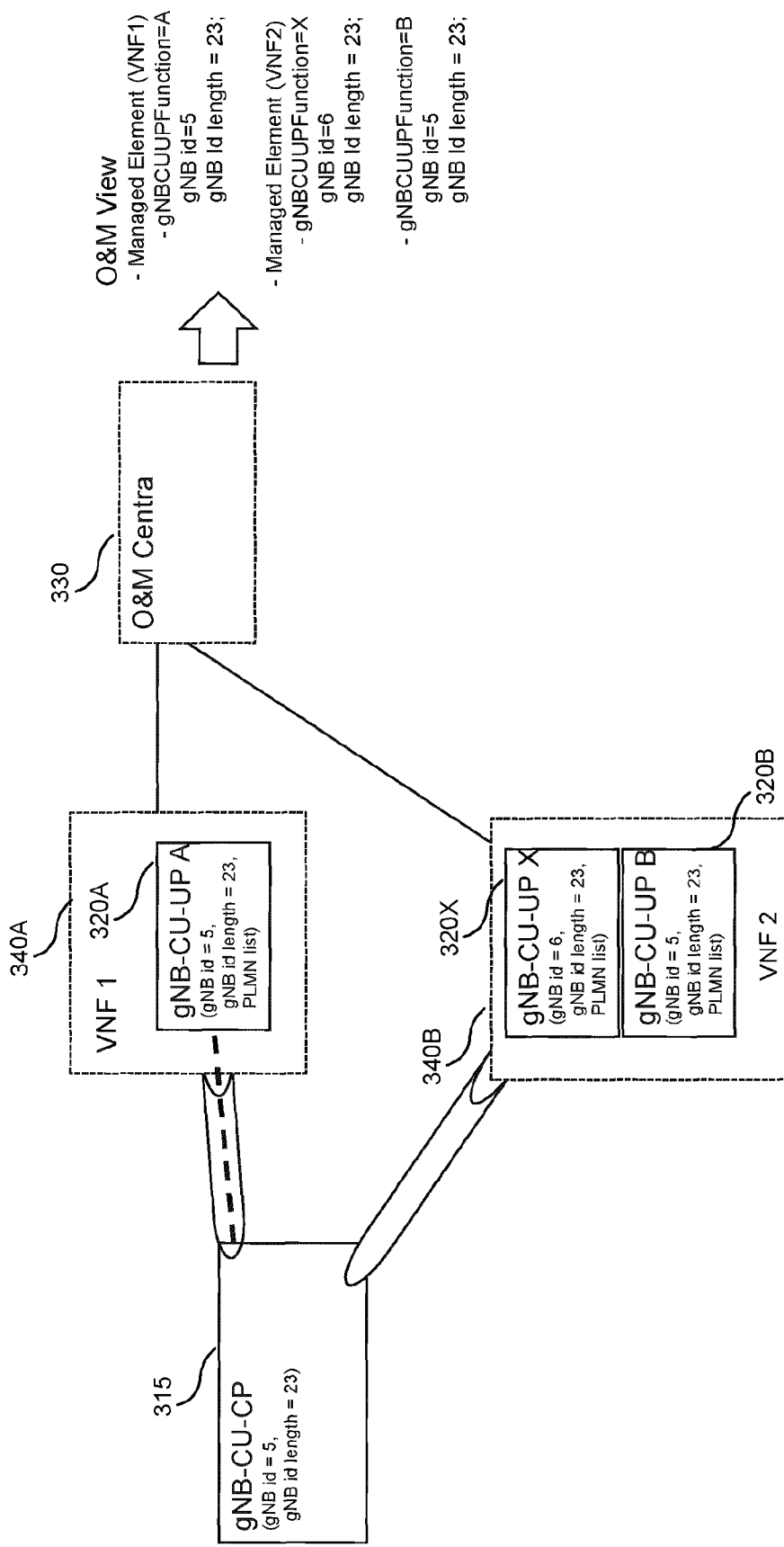
FIG. 3 illustrates a communication system and flow according to some embodiments.

FIG. 3 illustrates a communication system and flow according to some embodiments. FIG. 3 shares the same architecture as FIG. 2, described above. As shown in FIG. 3, the gNB-CU-CP 315 needs one more gNB-CU-UP logical node (hence for the same gNB), and knows IP addresses of a number of VNFs that contains the gNB-CU-UPs. The gNB-CU-CP 315 initiates setup of signaling transport towards a selected VNF (VNF2) 340B, which already supports a gNB-CU-UP 320X belonging to another gNodeB (gNB-CU-UP X belonging to gNB Id=6, gNB Id length=23). SCTP is the signaling transport layer mandated to be used between realization nodes realizing gNB-CU-CP and gNB-CU-UP.

Figure 4:
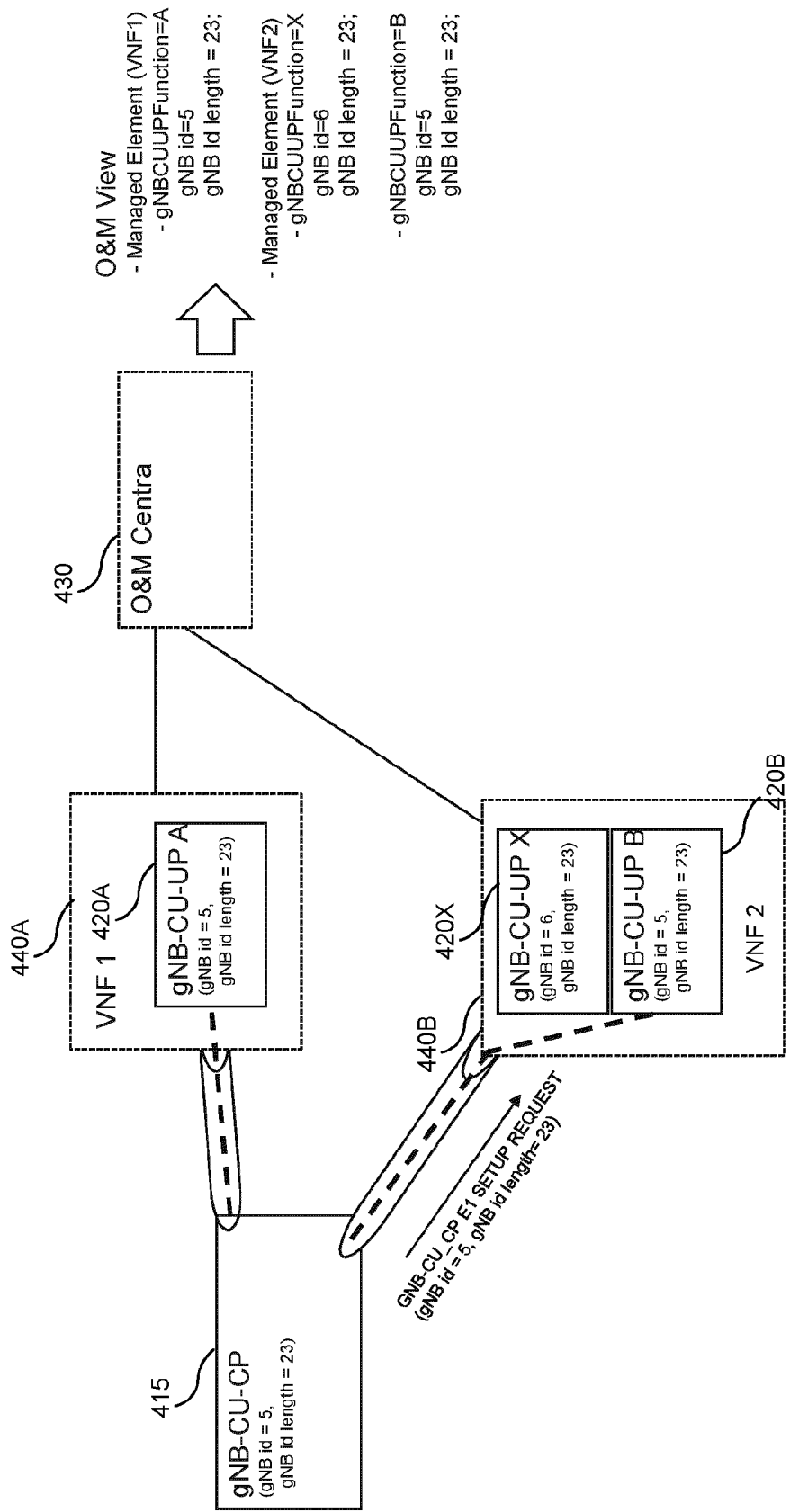
FIG. 4 illustrates a communication system and flow according to some embodiments.

FIG. 4 illustrates a communication system and flow according to some embodiments. FIG. 4 shares the same architecture as FIGS. 2-3. As shown in FIG. 4, the gNB-CU-CP 415 tries to establish contact with its gNB-CU-UP 420B (gNB-CU-UP B) in VNF 2 440B using a new signaling transport by setting up the E1 interface towards it using the E1AP messages GNB-CU-CP E1 SETUP REQUEST. As shown in FIG. 4, this message is now extended with gNB identity and gNB identity length. The VNF2 440B can then select the correct gNB-CU-UP 420B and respond back to the GNB-CU-CP 415 with the E1AP GNB-CU-CP E1 SETUP RESPONSE message.

As described in 3GPP TS 28.541, the gNB-CU-CP 215, 315, 415 function may be configured with the following attributes shown in Table 3:

TABLE 3

| Attribute name | Support Qualifier | isReadable | isWritable | isInvariant | isNotifyable |
|---|---|---|---|---|---|
| gNBId | M | T | T | F | T |
| gNBIdLength | M | T | T | F | T |
| gNBCUName | O | T | T | F | T |
| pLMNIdList | M | T | T | F | T |

Accordingly, the gNB-CU-CP 215, 315, 415 may simply include its configured gNBId and gNBIDLength in the new E1AP message.

Additionally, the VNF2 240B, 340B, 440B can select the correct gNB-CU-UP 220B, 320B, 420B using the corresponding gNBId and gNBIdLength configuration information of each gNB-CU-UP. As described in 3GPP TS 28.541, the gNB-CU-UP function may comprise the following attributes shown in Table 4:

TABLE 4

| Attribute name | Support Qualifier | isReadable | isWritable | isInvariant | isNotifyable |
|---|---|---|---|---|---|
| pLMNIdList | M | T | T | F | T |
| gNBId | M | T | T | F | T |
| gNBIdLength | M | T | T | F | T |

As shown in FIG. 4, if there is only one gNB-CU-UP per gNB on the same IP address, then providing gNB identity and gNB identity length is sufficient to enable the VNF2 440B to identify the correct gNB-CU-UP (gNB-CU-UP B) 220B.

Figure 5:
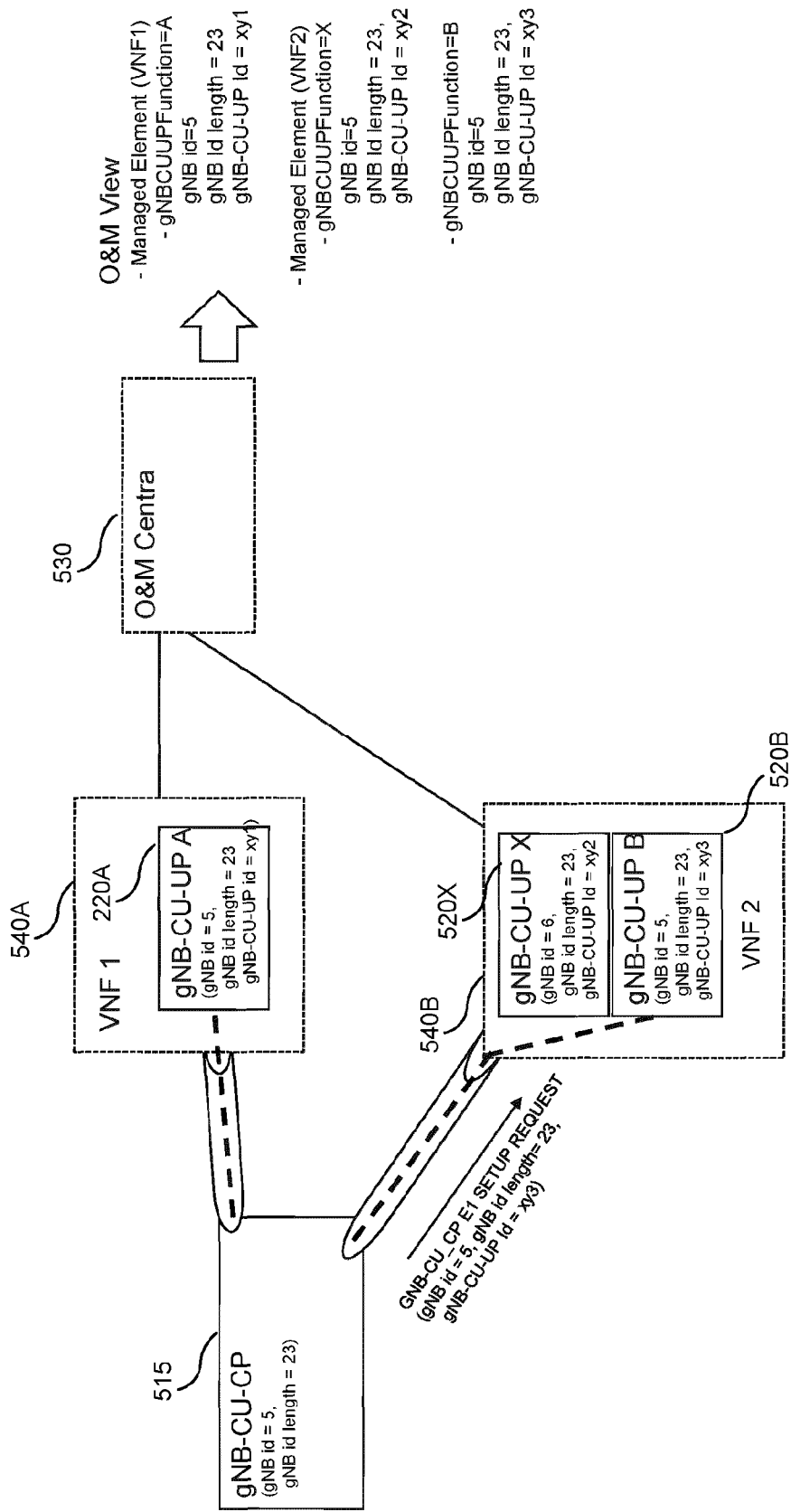
FIG. 5 illustrates a communication system and flow according to some embodiments.

FIG. 5 illustrates a communication system and flow according to some embodiments. FIG. 5 shares the same architecture as FIGS. 2-4, except that the VNF 2 540B contains two gNB-CU-UPs 520X, 520B belonging to the same gNB on the same IP address (gNB-CU-UP X, gNB-CU-UP B). In a scenario such as the one shown in FIG. 5 where there are more than one gNB-CU-UPs belonging to the same gNB and using the same IP address on a VNF, then more information is needed beyond the gNB identity and gNB identity length in the setup request message to allow the VNF to uniquely identify the correct gNB-CU-UP. This additional information, in some embodiments, may comprise the gNB-CU-UP identity as described in 3GPP TS 38.463 E1AP, which is hereby incorporated by reference in its entirety. In some embodiments, the gNB-CU-UP identity is unique per gNB-CU-CP, and is therefore unique per gNodeB. Accordingly, the gNB-CU-CP 515 may obtain the gNB-CU-UP identity using its configured gNBId and gNBIdLength configuration information. As shown in FIG. 5, the SETUP Request message is now extended with gNB identity, gNB identity length, and gNB-CU-UP identity. The VNF2 540B can then select the correct gNB-CU-UP 520B using the information in the message, and respond back to the GNB-CU-CP 515 with the E1AP GNB-CU-CP E1 SETUP RESPONSE message.

Figure 6:
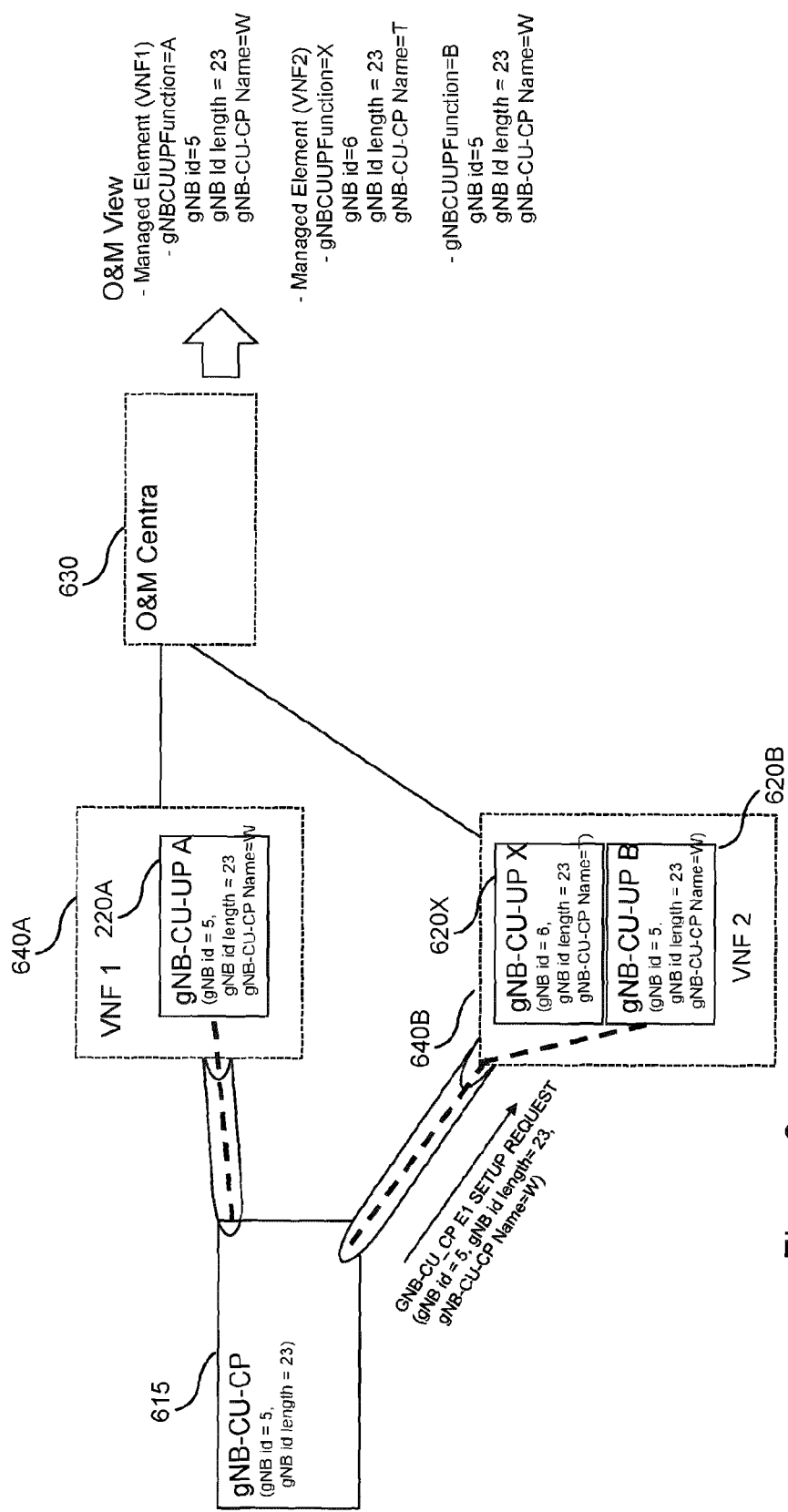
FIG. 6 illustrates a communication system and flow according to some embodiments.

FIG. 6 illustrates a communication system and flow according to some embodiments. FIG. 6 shares the same architecture as FIGS. 2-4, where the VNF 2 640B contains two gNB-CU-UPs 620X, 620B on the same IP address, where one gNB-CU-UP (gNB-CU-UP X) 620X belongs to a first gNB (gNB Id=6) and a second gNB-CU-UP (gNB-CU-UP B) 620B belongs to a second gNB (gNB Id=5) different than the first gNB. In embodiments where the gNB-CU-UP is additionally configured with the gNB-CU-CP Name, inclusion of the gNB-CU-CP Name in the SETUP Request message from the gNB-CU-CP may allow the VNF to uniquely identify the correct gNB-CU-UP. As shown in FIG. 6, the E1AP GNB-CU-CP E1 SETUP REQUEST message is extended with gNB-CU-CP Name. In this case, the VNF can only handle one gNB-CU-UP belonging to the same gNodeB (similar to FIGS. 3-4). According to such embodiments, the attribute information for the gNB-CU-UP function as described in 3GPP TS 28.541 may be extended to comprise the gNB-CU-CP Name attribute.

Figure 7:
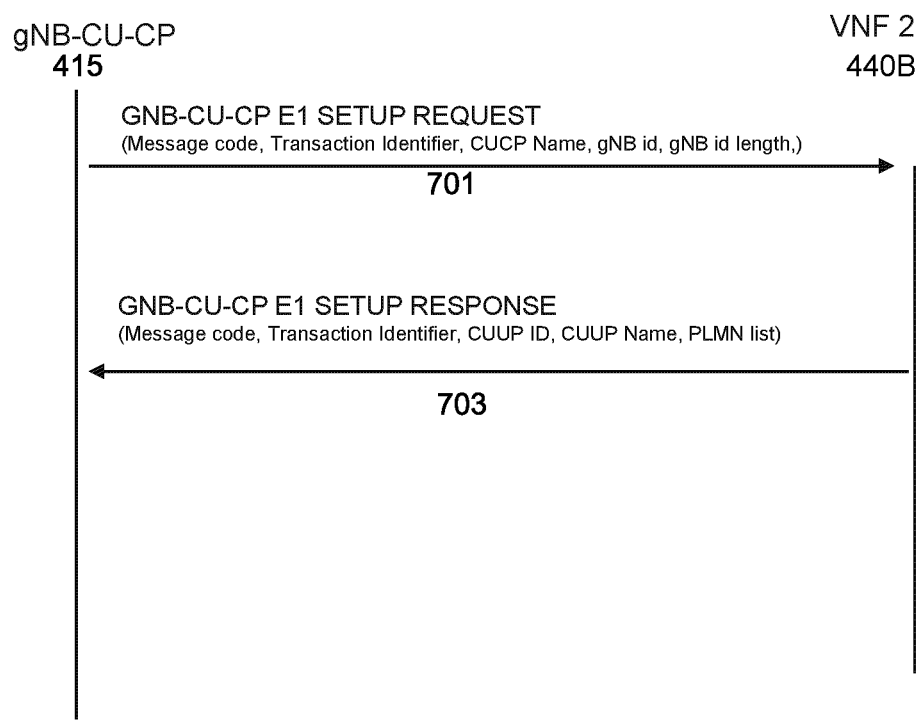
FIG. 7 illustrates a message flow according to some embodiments.

FIG. 7 illustrates a message flow according to some embodiments. The gNB-CU-CP 415 and VNF2 440B depicted in FIG. 7 correspond to the gNB-CU-CP 415 depicted in FIG. 4. As shown in FIG. 7, a gNB-CU-CP 415 transmits a GNB-CU-CP E1 SETUP REQUEST message 701 towards a VNF2 240B. The SETUP REQUEST message 701 may comprise the message code, transaction identifier, and gNB-CU-CP Name as specified in TS 38.463. According to some embodiments, the SETUP REQUEST message 701 is extended to include gNB identity and gNB length. As described above in connection with FIG. 4, the VNF2 440B may use the gNB identity and gNB length in order to select the correct gNB-CU-UP, and send a GNB-CU-CP E1 SETUP RESPONSE 703 towards the gNB-CU-CP. The SETUP RESPONSE message 703 may comprise the message code, transaction identifier, gNB-CU-UP identifier, gNB-CU-CP Name, and PLMN list attributes as specified in TS 38.463.

Figure 8:
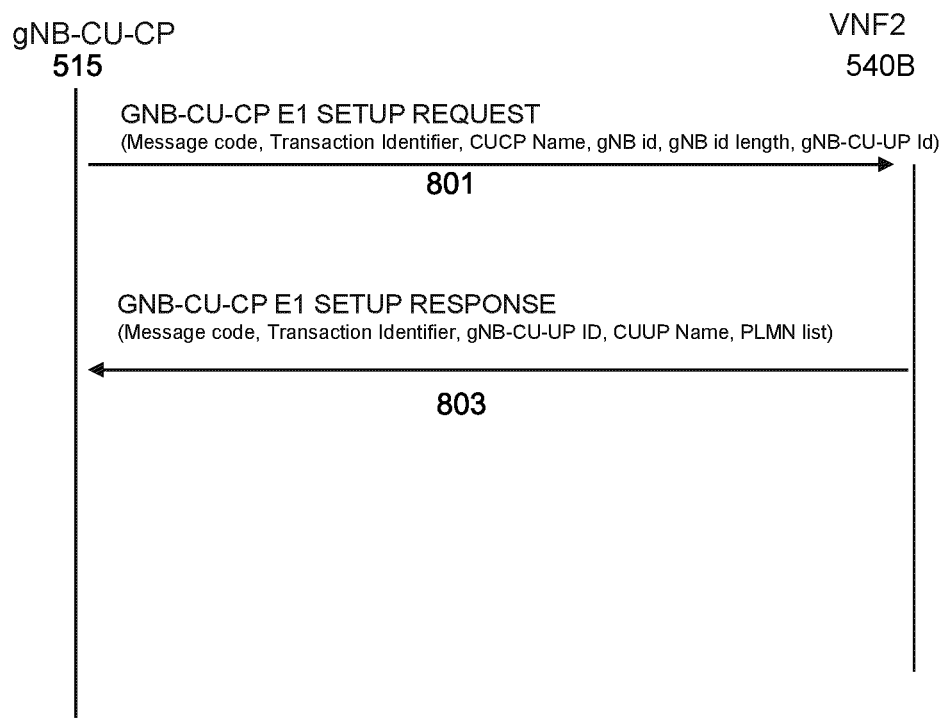
FIG. 8 illustrates a message flow according to some embodiments.

FIG. 8 illustrates a message flow according to some embodiments. The gNB-CU-CP 515 and VNF2 540B depicted in FIG. 8 correspond to the gNB-CU-CP depicted in FIG. 5. As shown in FIG. 8, a gNB-CU-CP 515 transmits a GNB-CU-CP E1 SETUP REQUEST message 801 towards a VNF2 540B. The SETUP REQUEST message 801 may comprise the message code, transaction identifier, and gNB-CU-CP Name as specified in TS 38.463. According to some embodiments, the SETUP REQUEST message 801 is extended to include gNB identity, gNB length, and a gNB-CU-UP identity. As described above in connection with FIG. 5, the VNF2 540B may use the gNB identity, gNB length, and/or gNB-CU-UP identity in order to select the correct gNB-CU-UP, and send a GNB-CU-CP E1 SETUP RESPONSE 803 towards the gNB-CU-CP. The SETUP RESPONSE message 803 may comprise the message code, transaction identifier, gNB-CU-UP identifier, gNB-CU-CP Name, and PLMN list attributes as specified in TS 38.463.

Figure 9:
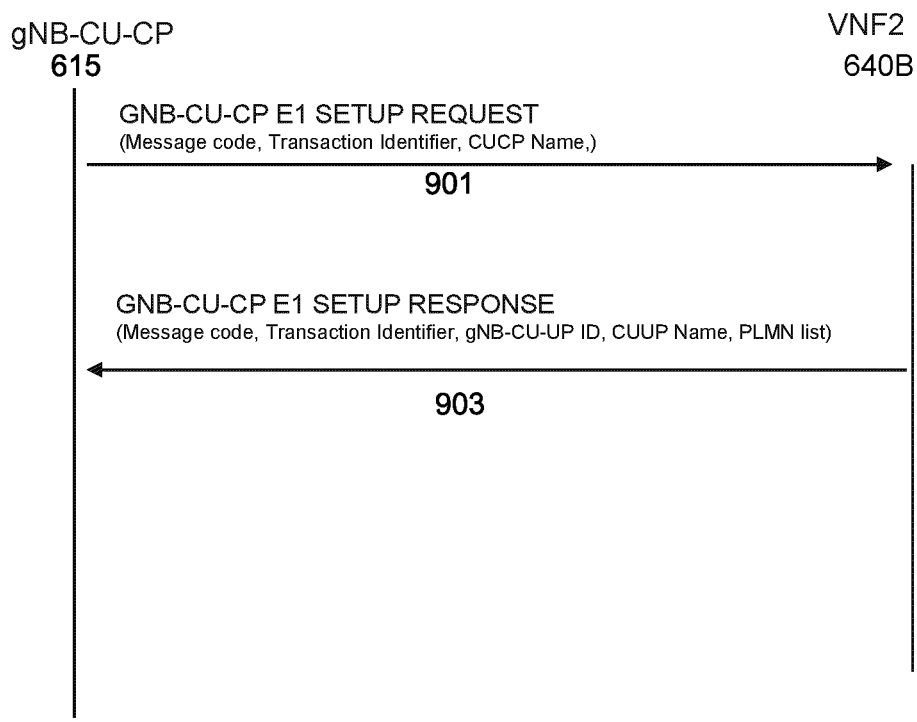
FIG. 9 illustrates a message flow according to some embodiments.

FIG. 9 illustrates a message flow according to some embodiments. The gNB-CU-CP 615 and VNF2 640B depicted in FIG. 8 correspond to the gNB-CU-CP 615 depicted in FIG. 6. As shown in FIG. 9, a gNB-CU-CP 615 transmits a GNB-CU-CP E1 SETUP REQUEST message 901 towards a VNF2 640B. The SETUP REQUEST message 901 may comprise the message code, transaction identifier, and gNB-CU-CP Name as specified in TS 38.463. According to some embodiments, each gNB-CU-UP is configured with a gNB-CU-CP name. Accordingly, as described above in connection with FIG. 6, the VNF2 640B may use the gNB-CU-CP name in order to select the correct gNB-CU-UP, and send a GNB-CU-CP E1 SETUP RESPONSE 903 towards the gNB-CU-CP 615. The SETUP RESPONSE message 903 may comprise the message code, transaction identifier, gNB-CU-UP identifier, gNB-CU-CP Name, and PLMN list attributes as specified in TS 38.463.

Figure 10:
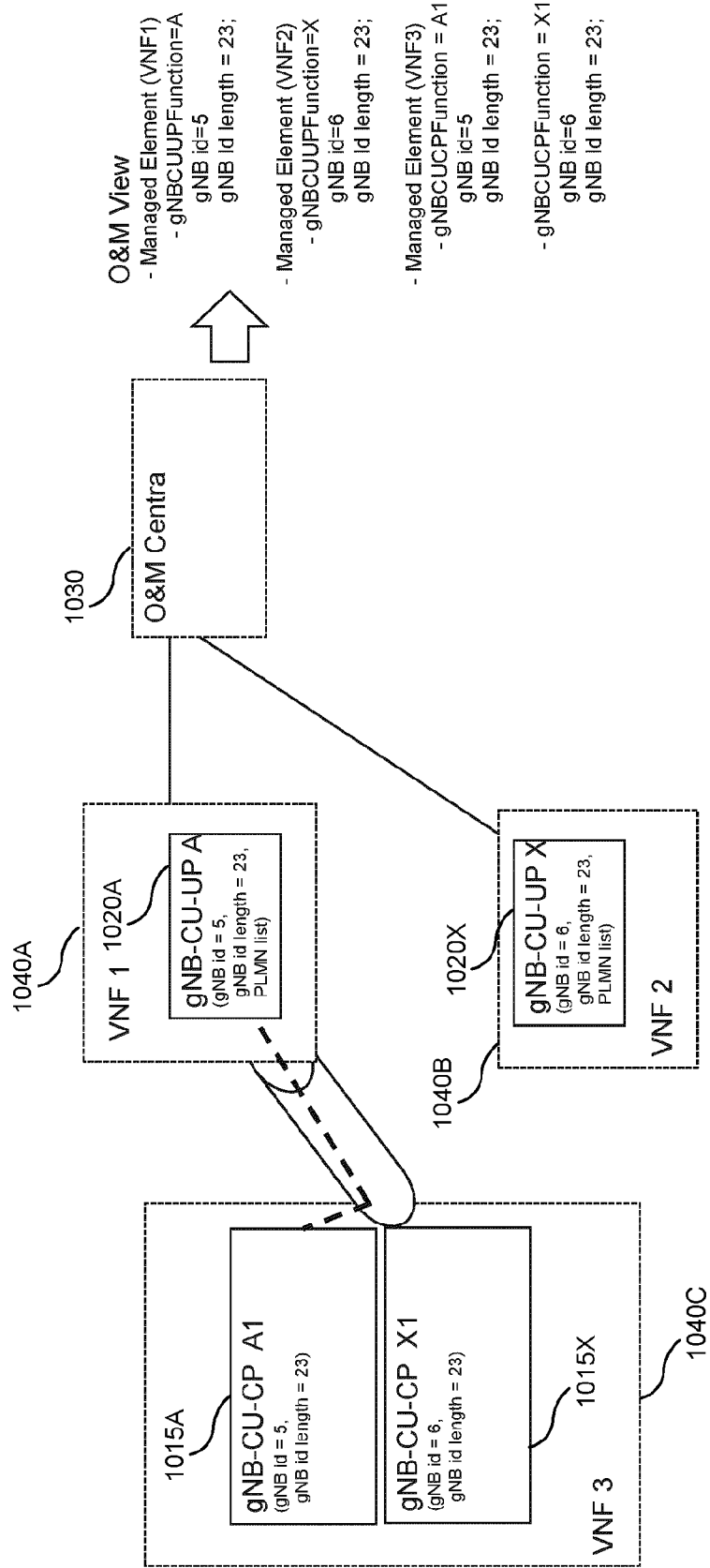
FIG. 10 illustrates a communication system and flow according to some embodiments.

FIG. 10 illustrates a communication system and flow according to some embodiments. A certain gNodeB is made up via one gNB-CU-CP, one gNB-CU-UP, and a number of gNB-DUs (gNB-DUs are not shown in FIG. 10). FIG. 10 depicts a communication system with a gNB-CU-CP logical nodes 1015A, 1015X realized in the cloud by a certain type of VNF (VNF3) 1040C and gNB-CU-UP logical nodes 1020A, 1020X realized in the cloud by certain types of VNFs (VNF1, VNF2) 1040A, 1040B. Each VNF 1040A-C can support one or more gNB-CU-UPs (e.g., gNB-CU-UP A, gNB-CU-UP X, gNB-CU-UP B) 1020A, 1020X and/or one or more gNB-CU-CPs (e.g., gNB-CU-CP A1, gNB-CU-CP X1) 1015A, 1015X. As shown in FIG. 10, the gNB-CU-UP A 1020A is realized by the VNF 1 1040A, and is coupled with gNB-CU-CP A1 1015A realized by VNF3 1040C for a specific gNB (gNB id=5, gNB Id length=23).

Figure 11:
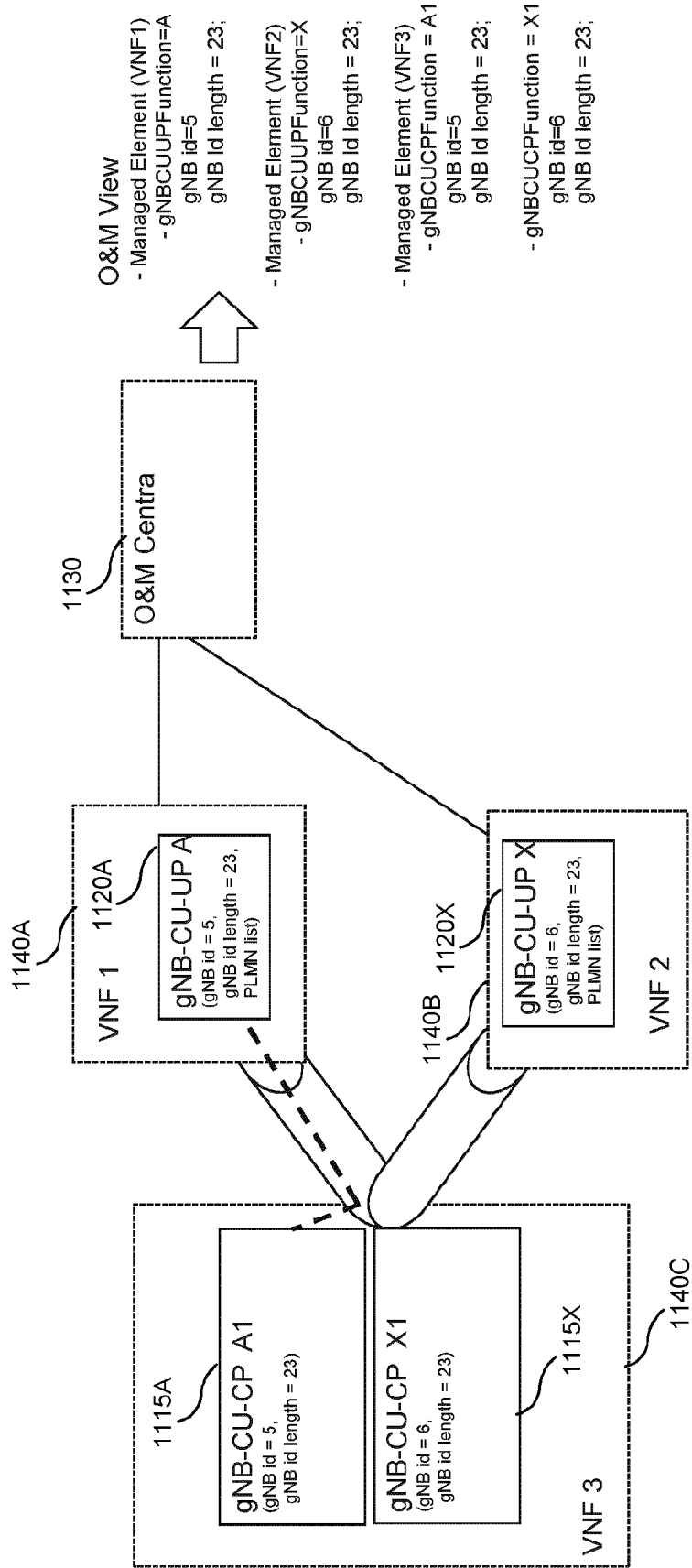
FIG. 11 illustrates a communication system and flow according to some embodiments.

FIG. 11 illustrates a communication system and flow according to some embodiments. FIG. 11 shares the same architecture as FIG. 10, described above. As shown in FIG. 11, the gNB-CU-UP X 120X needs to establish a connection with a gNB-CU-CP logical node (hence for the same gNB), and knows IP addresses of a VNF 1120C that contains the gNB-CU-CPs. The gNB-CU-UP X 1120X initiates setup of signaling transport towards a selected VNF (VNF3) 1140C, which already supports a gNB-CU-CP belonging to another gNodeB (gNB-CU-CP A1 belonging to gNB Id=5, gNB Id length=23) 1115A. (SCTP is the signaling transport layer mandated to be used between realization nodes realizing gNB-CU-CP and gNB-CU-UP).

Figure 12:
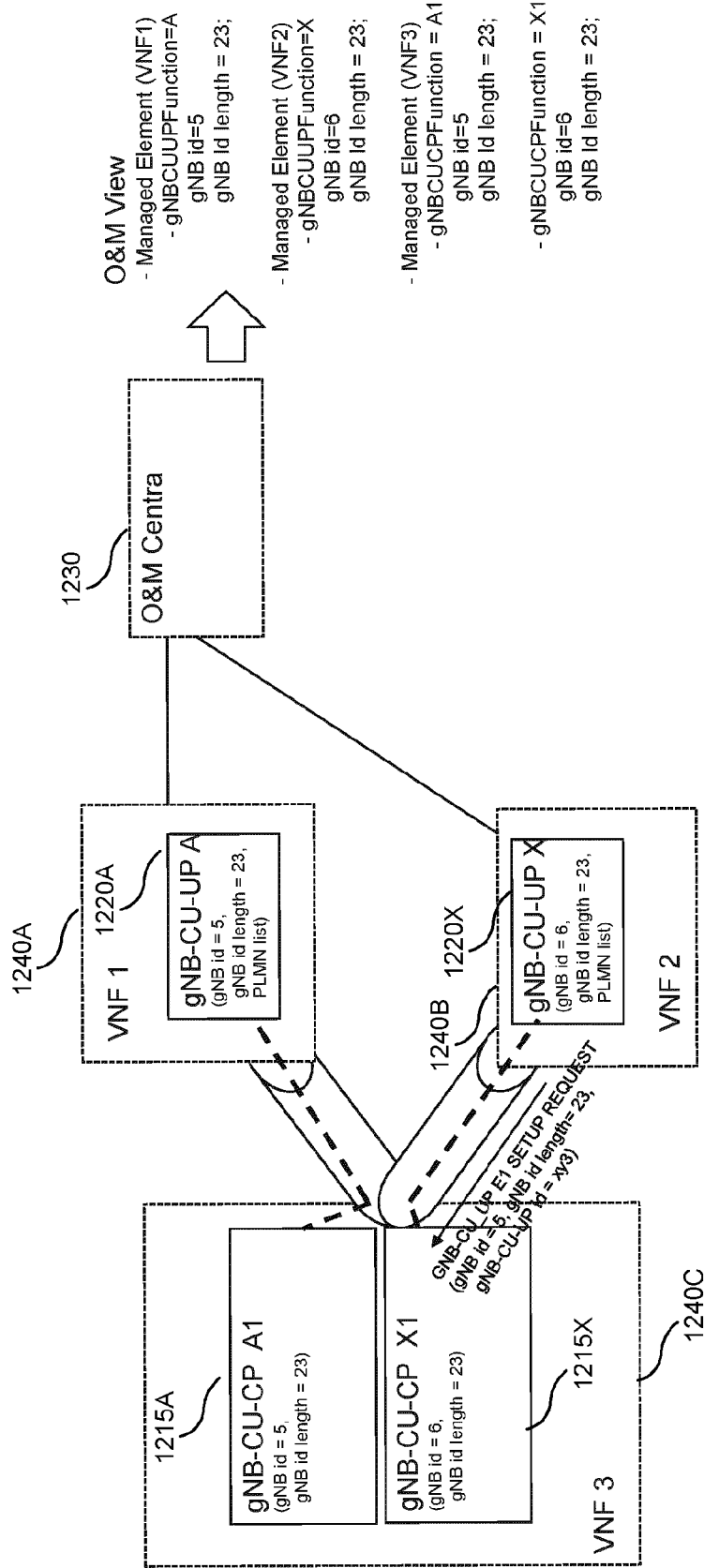
FIG. 12 illustrates a communication system and flow according to some embodiments.

FIG. 12 illustrates a communication system and flow according to some embodiments. FIG. 12 shares the same architecture as FIGS. 10-11. As shown in FIG. 12, the gNB-CU-UP (gNB-CU-UP X) 1220X tries to establish contact with its gNB-CU-CP (gNB-CU-CP X1) 1215X in VNF 3 1220C using a new signaling transport by setting up the E1 interface towards it using the E1AP messages GNB-CU-UP E1 SETUP REQUEST. As shown in FIG. 12, this message is now extended with gNB identity and gNB identity length, as configured in the gNB-CU-UP X 1220X. The VNF3 1240C can then select the correct gNB-CU-CP 1215X that has the corresponding gNB identity and gNB identity length, and respond back to the GNB-CU-UP 1220X with the E1AP GNB-CU-UP E1 SETUP RESPONSE message.

Figure 13:
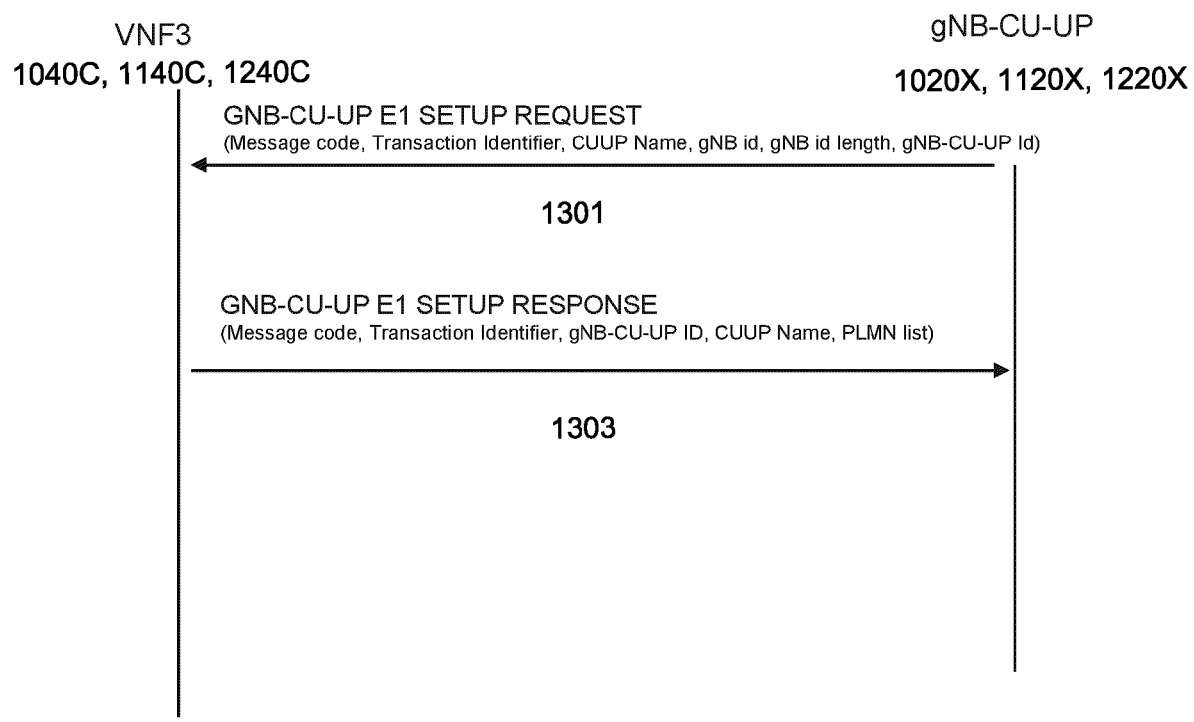
FIG. 13 illustrates a message flow according to some embodiments.

FIG. 13 illustrates a message flow according to some embodiments. The gNB-CU-UP and VNF3 depicted in FIG. 13 corresponds to the gNB-CU-UP X 1020X, 1120X, 1220X and VNF3 1040C, 1140C, 1240C depicted in FIGS. 10-12. As shown in FIG. 13, a gNB-CU-UP 1020X, 1120X, 1220X transmits a GNB-CU-UP E1 SETUP REQUEST message 1301 towards a VNF3. The SETUP REQUEST message 1301 may comprise the message code, transaction identifier, gNB-CU-UP identifier, gNB-CU-CP Name, and PLMN list attributes as specified in TS 38.463. According to some embodiments, the SETUP REQUEST message 1301 is extended to include gNB identifier and the gNB identifier length. As described above in connection with FIG. 12, the VNF3 may use the gNB identifier and gNB identifier length in order to select the correct gNB-CU-CP. In some embodiments, the VNF3 may further use the gNB-CU-UP identifier in order to select the correct gNB-CU-CP. After selecting the correct gNB-CU-CP, the VNF3 transmits a GNB-CU-UP E1 SETUP RESPONSE 1303 towards the gNB-CU-UP. The SETUP RESPONSE 1303 message may comprise the message code, transaction identifier, gNB-CU-CP Name, gNB-CU-UP Id, and PLMN list as specified in TS 38.463.

Figure 14:
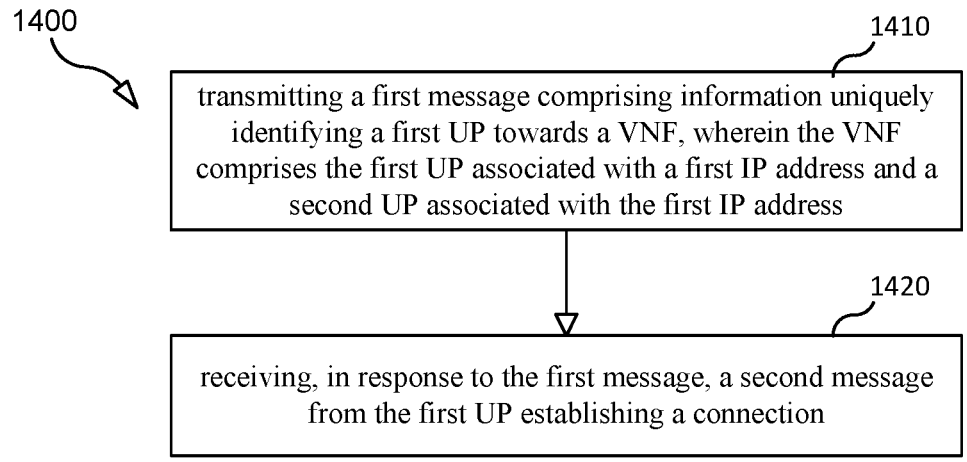
FIG. 14 illustrates a process according to some embodiments.

FIG. 14 illustrates a process 1400 according to some embodiments. Process 1400 may be a method performed by a gNB-CU-CP realized in a communications network as depicted in FIGS. 4-6. The method includes transmitting a first message comprising information uniquely identifying a first UP towards a VNF, wherein the VNF comprises the first UP associated with a first IP address and a second UP associated with the first IP address (step 1410). The method further includes the step of receiving, in response to the first message, a second message from the first UP establishing a connection. In some embodiments, the first message may be the SETUP REQUEST message as described above in connection with FIGS. 4-6.

Figure 15:
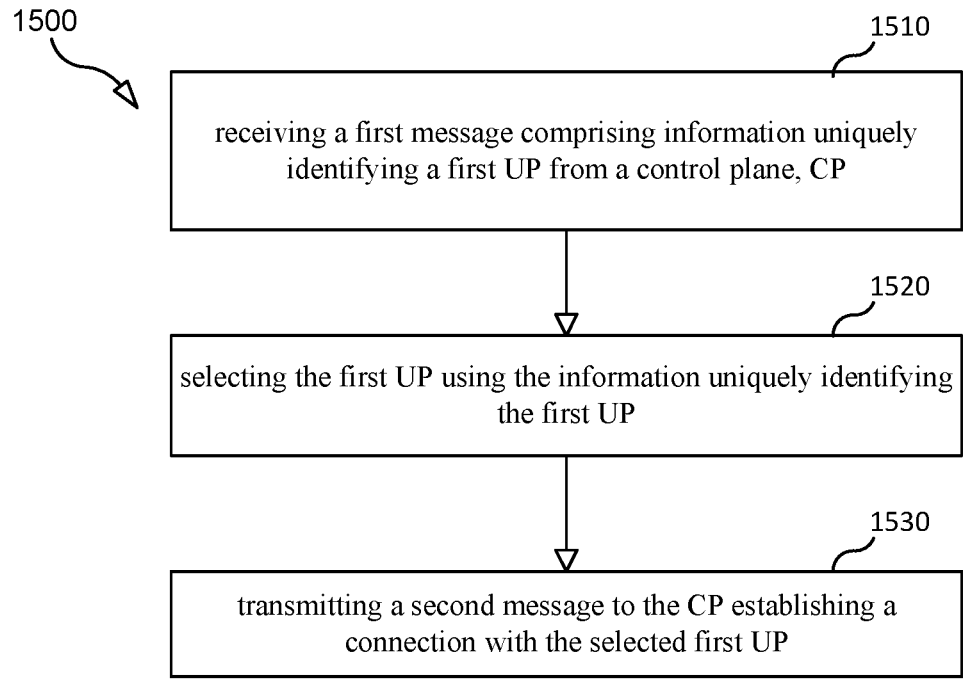
FIG. 15 illustrates a process according to some embodiments.

FIG. 15 illustrates a process 1500 according to some embodiments. Process 1500 may be a method performed by a VNF realizing a gNB-CU-UP, such as VNF2 realized in the communications network depicted in FIGS. 4-6 comprising a first UP associated with a first IP address and a second UP associated with the first IP address. The method includes receiving a first message comprising information uniquely identifying the first UP from a control plane (step 1510). The method further includes the step of selecting the first UP using the information uniquely identifying the first UP (step 1520). The method further includes the step of transmitting a second message to the control plane establishing a connection with the selected first UP. In some embodiments, the first message may be the SETUP REQUEST message as described above in connection with FIGS. 4-6.

Figure 16:
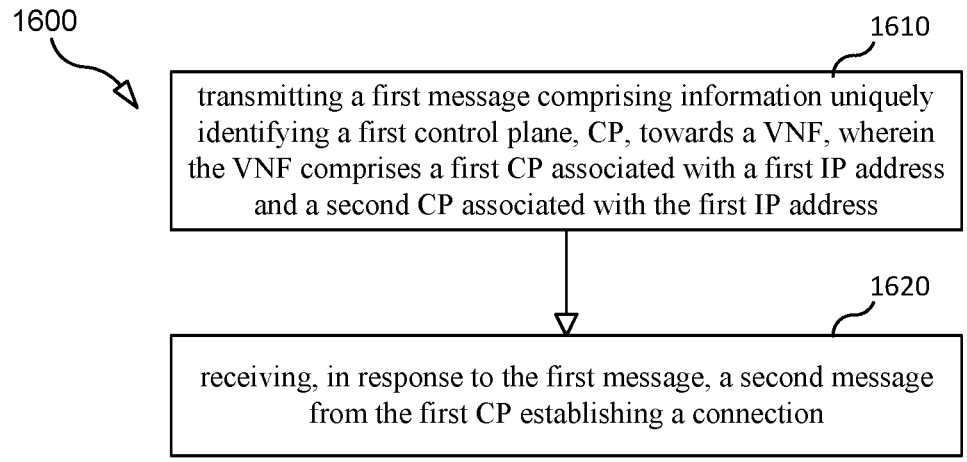
FIG. 16 illustrates a process according to some embodiments.

FIG. 16 illustrates a process 1600 according to some embodiments. Process 1600 may be a method performed by a user plane realized in the communications network depicted in FIGS. 10-12. The method includes transmitting a first message comprising information uniquely identifying a first control plane towards a VNF, wherein the VNF comprises a first CP associated with a first IP address and a second CP associated with the first IP address (step 1610). The method further includes the step of receiving, in response to the first message, a second message from the first CP establishing a connection (step 1620). In some embodiments, the first message may be the SETUP REQUEST message as described above in connection with FIG. 10.

Figure 17:
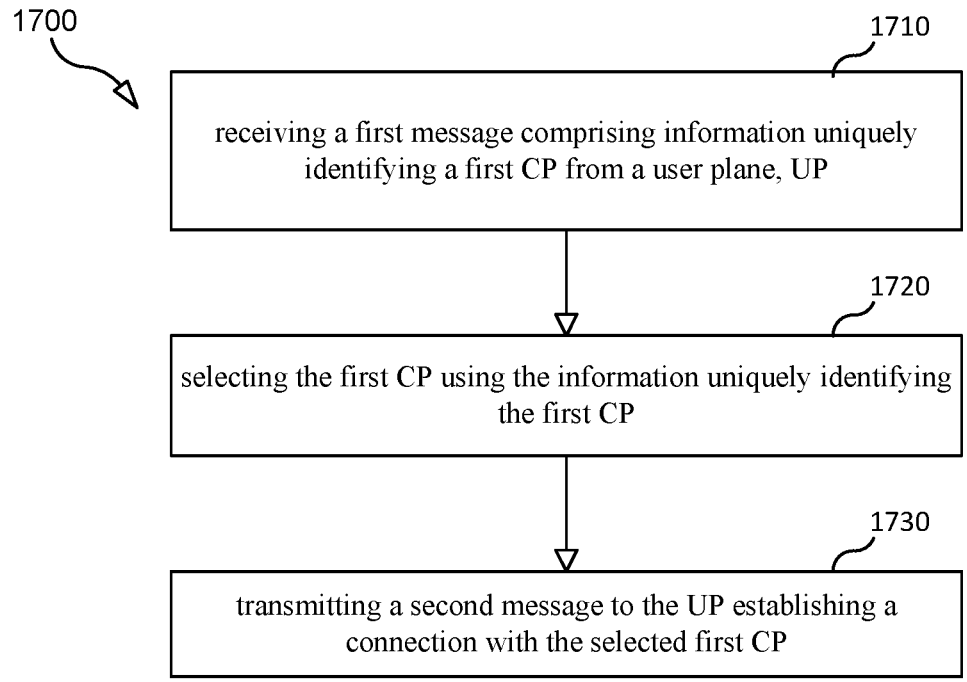
FIG. 17 illustrates a process according to some embodiments.

FIG. 17 illustrates a process 1700 according to some embodiments. Process 1700 may be a method performed by VNF3 realized in the communications network depicted in FIGS. 10-12, the VNF3 comprising a first control plane and a second control plane associated with the same IP address. The method includes receiving a first message comprising information uniquely identifying a first control plane from a user plane (step 1710). The method further includes the step of selecting the first CP using the information uniquely identifying the first CP (step 1720). The method further includes transmitting a second message to the UP establishing a connection with the selected first CP (step 1730). In some embodiments, the first message may be the SETUP REQUEST message as described above in connection with FIG. 10.

Figure 18:
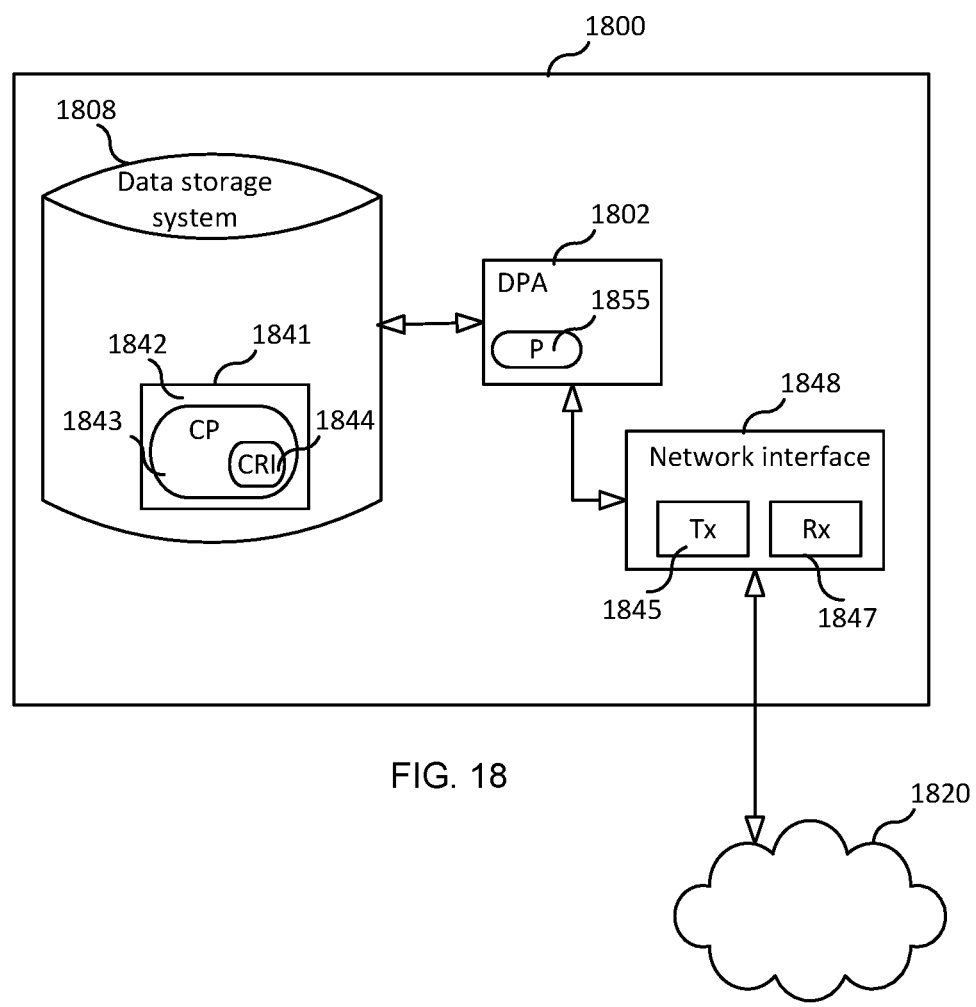
FIG. 18 is a block diagram of a node according to some embodiments.
Figure 19:
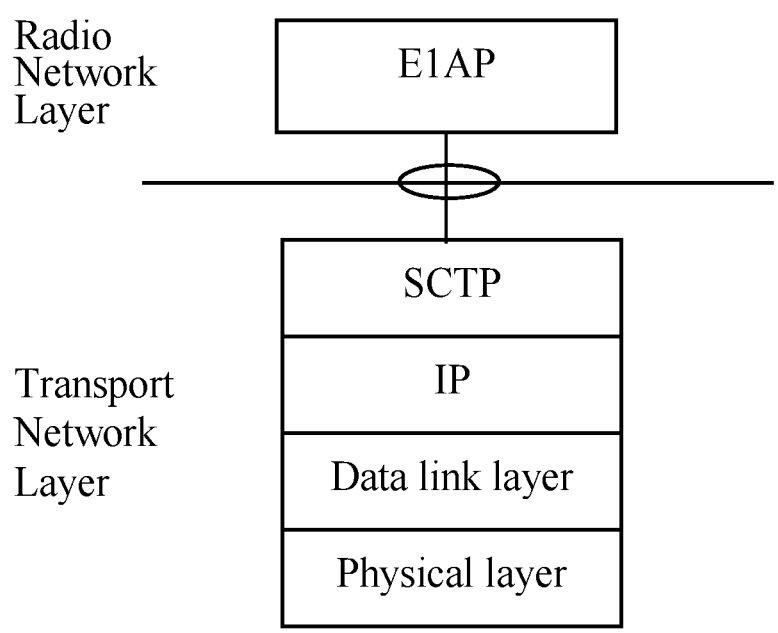
FIG. 19 is a block diagram of a signalling bearer protocol stack, according to some embodiments.

FIG. 18 is a block diagram of a node (e.g., a control plane function, a user plane function, and/or a VNF realizing a plurality of control plane functions and/or user plane functions) according to some embodiments. As shown in FIG. 18, the node may comprise: processing circuitry (PC) 1802, which may include one or more processors (P) 1855 (e.g., a general purpose microprocessor and/or one or more other processors, such as an application specific integrated circuit (ASIC), field-programmable gate arrays (FPGAs), and the like); a network interface 1848 comprising a transmitter (Tx) 1845 and a receiver (Rx) 1847 for enabling the node to transmit data to and receive data from other nodes connected to a network 1820 (e.g., an Internet Protocol (IP) network or cloud) to which network interface 1848 is connected; and a local storage unit (a.k.a., "data storage system") 1808, which may include one or more non-volatile storage devices and/or one or more volatile storage devices. In embodiments where PC 1802 includes a programmable processor, a computer program product (CPP) 1841 may be provided. CPP 1841 includes a computer readable medium (CRM) 1842 storing a computer program (CP) 1843 comprising computer readable instructions (CRI) 1844. CRM 1842 may be a non-transitory computer readable medium, such as, magnetic media (e.g., a hard disk), optical media, memory devices (e.g., random access memory, flash memory), and the like. In some embodiments, the CRI 1844 of computer program 1843 is configured such that when executed by PC 1802, the CRI causes the node to perform steps described herein (e.g., steps described herein with reference to the flow charts). In other embodiments, the node may be configured to perform steps described herein without the need for code. That is, for example, PC 1802 may consist merely of one or more ASICs. Hence, the features of the embodiments described herein may be implemented in hardware and/or software.

Concise Description of Various Embodiments

A1. A method performed by a control plane, CP, the method comprising: transmitting a first message comprising information uniquely identifying a first UP towards a VNF, wherein the VNF comprises the first UP associated with a first IP address and a second UP associated with the first IP address; and, receiving, in response to the first message, a second message from the first UP establishing a connection.

A2. The method of embodiment A1, wherein the first UP is configured for a first base station, the second UP is configured for a second base station different than the first base station, and the information uniquely identifying the first UP comprises an identifier of the first base station (gNB ID) and a length of the identifier of the first base station (gNB id length).

A3. The method of embodiment A1, wherein the first UP and second UP are configured for a base station, and the information uniquely identifying the first UP comprises a unique identifier of the first UP (gNB-CU-UP ID).

A4. The method of embodiment A1, wherein the CP is configured for a first base station, the first UP is configured for the first base station, the second UP is configured for a second base station different than the first base station, and the information uniquely identifying the first UP comprises a name of the CP (CUCP Name) pre-configured in the first UP.

B1. A method performed by a virtualized network function, VNF, comprising a first user plane, UP, with a first IP address and a second UP with the first IP address, the method comprising: receiving a first message comprising information uniquely identifying the first UP from a control plane, CP; selecting the first UP using the information uniquely identifying the first UP; and transmitting a second message to the CP establishing a connection with the selected first UP.

B2. The method of embodiment B1, wherein the first UP is configured for a first base station, the second UP is configured for a second base station different than the first base station, and the information uniquely identifying the first UP comprises an identifier of the first base station (gNB id) and a length of the identifier of the first base station (gNB id length).

B3. The method of embodiment B1, wherein the first UP and second UP are configured for a base station, and the information uniquely identifying the first UP comprises a unique identifier of the first UP (gNB-CU-UP id).

B4. The method of embodiment B1, further comprising: configuring the first user plane with a name of the CP (CUCP Name).

B5. The method of embodiment B4, wherein the CP is configured for a first base station, the first UP is configured for the first base station, the second UP is configured for a second base station different than the first base station, and the information uniquely identifying the first UP comprises the name of the CP (CUCP Name) configured in the CP.

C1. A method performed by a user plane, UP, the method comprising: transmitting a first message comprising information uniquely identifying a first control plane, CP, towards a VNF, wherein the VNF comprises the first CP associated with a first IP address and a second CP associated with the first IP address; and, receiving, in response to the first message, a second message from the first CP establishing a connection.

C2. The method of embodiment C1, wherein the first CP is configured for a first base station, the second CP is configured for a second base station different than the first base station, and the information uniquely identifying the first CP comprises an identifier of the first base station (gNB ID) and a length of the identifier of the first base station (gNB id length).

D1. A method performed by a virtualized network function, VNF, comprising a first control plane, CP, with a first IP address and a second CP with the first IP address, the method comprising: receiving a first message comprising information uniquely identifying the first CP from a user plane, UP; selecting the first CP using the information uniquely identifying the first CP; and transmitting a second message to the UP establishing a connection with the selected first CP.

D2. The method of embodiment D1, wherein the first CP is configured for a first base station, the second CP is configured for a second base station different than the first base station, and the information uniquely identifying the first CP comprises an identifier of the first base station (gNB ID) and a length of the identifier of the first base station (gNB id length).

While various embodiments are described herein (including the Appendix, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The following text comprises the appendix from the provisional.

Appendix

1 Introduction

In this contribution, we propose to add the Global gNB-ID in E1 Setup from gNB-CU-CP to gNB-CU-UP in order to solve the authorization and RAN sharing issues.

will need to configure the gNB-CU-UP with the IP addresses of all the gNB-CU-CP which it can be connected to via E1 interface.

Observation 2: gNB-CU-UP needs to be configured with all the gNB-CU-CP's IP addresses which it can be connected to via E1 interface Furthermore, looking at TS 28.451, it can be seen that the following parameters are required to configure a gNB-CU-UP function in case of virtualized architecture as shown in the following table

| Attribute name | Support Qualifier | isReadable | isWritable | isInvariant | isNotifyable |
| --- | --- | --- | --- | --- | --- |
| pLMNIdList | M | T | T | F | T |
| gNBId | M | T | T | F | T |
| gNBIdLength | M | T | T | F | T |

2 Discussion

In order to setup E1 interface between gNB-CU-CP and gNB-CU-UP, 2 procedures are defined in TS 38.463. The first one is initiated by the gNB-CU-UP and the second one by the gNB-CU-CP. This contribution is focusing on the latter case. In order to establish an E1 interface instance between a gNB-CU-CP and a gNB-CU-UP, the gNB-CU-CP needs to establish an SCTP/IP connection first (i.e. SCTP association).

The IP address of the gNB-CU-UP may be e.g. configured by OAM or obtained by DNS Service Discovery. The SCTP destination port is sct to 38462 according to TS 38.462.

After establishing this first TNL association, the first message of the procedure (i.e. GNB-CU-CP E1 SETUP REQUEST) is sent with the following parameters shown in Table 5.

In order to deploy the gNB-CU-UP function, the gNB-ID needs to be configured first. But this parameter is managed by the gNB-CU-CP. Therefore having it signalled over E1 would remove the burden of configuration by the operator.

Observation 3: In a virtualized architecture, the gNB-ID needs to be configured when deploying a gNB-CU-UP instance Therefore, adding the gNB-ID in GNB-CU-CP E1 SETUP REQUEST would solve all these issues. It will allow the gNB-CU-UP to uniquely identify the gNB-CU-CP. It is easier to configure than an IP address (e.g. range partitioning, IP addresses can be more dynamic, IP addresses are managed by the transport network, etc . . . ). And it would remove the need for the operator to configure it in case of gNB-CU-UP virtualized function deployment.

Proposal: Add Global gNB-ID in GNB-CU-CP E1 SETUP REQUEST message

As a conclusion it is proposed to add the Global gNB-ID in E1 Setup from gNB-CU-CP to gNB-CU-UP in order to

TABLE 5

| | | | | | | |
| --- | --- | --- | --- | --- | --- | --- |
| GNB-CU-CP E1 SETUP REQUEST parameters | | | | | | |
| IE/Group Name | Presence | Range | IE type and reference | Semantics description | Criticality | Assigned Criticality |
| Message Type | M | | 9.3.1.1 | | YES | reject |
| Transaction ID | M | | 9.3.1.53 | | YES | reject |
| gNB-CU-CP Name | O | | Printable-String(SIZE (1 . . . 150, . . . )) | Human readable name of the gNB-CU-CP. | YES | ignore |

At E1AP level, it can be seen that the only the gNB-CU-CP Name IE may (as it is optional) be used by the gNB-CU-UP to uniquely identify the gNB-CU-CP.

Observation 1: At E1AP level, only the gNB-CU-CP Name IE may be used by the gNB-CU-UP to uniquely identify the gNB-CU-CP However, for e.g. RAN sharing, this IE may be the same for all the gNB-IDs supported by the gNB-CU-CP.

Another issue is related to authorization. When receiving the first E1AP message, from an unknown IP address, the gNB-CU-UP does not know if it has the authorization to be connected to this gNB-CU-CP. It means that the operator solve the authorization and RAN sharing issues. The following observations and proposals have been discussed.

Observation 1: At E1AP level, only the gNB-CU-CP Name IE may be used by the gNB-CU-UP to uniquely identify the gNB-CU-CP.

Observation 2: gNB-CU-UP needs to be configured with all the gNB-CU-CP's IP addresses which it can be connected to via E1 interface.

Observation 3: In a virtualized architecture, the gNB-ID needs to be configured when deploying a gNB-CU-UP instance.

Proposal: Add Global gNB-ID in GNB-CU-CP E1 SETUP REQUEST message.

The invention claimed is:

1. A method performed by a central unit (CU)-control plane (CP) functional part of a first base station, the method comprising:
   establishing a transport network layer (TNL) association with a network function that supports a plurality of central unit (CU)-user plane (UP) functional parts of the first base station, the plurality of CU-UP functional parts having a same Internet Protocol (IP) address;
   transmitting to the network function a request message for setting up an E1 interface and comprising information for selecting a first CU-UP functional part among the plurality of CU-UP functional parts, the information in the request message comprising at least an identifier of the first base station and a length of the identifier of the first base station; and
   receiving, in response to the request message, a response message transmitted by the network function, the response message comprising an identifier of the first CU-UP functional part.

2. The method of claim 1, wherein
   the network function further supports a second CU-UP functional part of the first base station, or
   the network function further supports a CU-UP functional part of a second base station.

3. The method of claim 1, wherein the information for selecting the first CU-UP functional part of the first base station comprises one or more of: an identifier of the first CU-UP functional part of the first base station, or a name of the CU-CP functional part of the first base station.

4. The method of claim 1, wherein the network function supports a second CU-UP functional part of a second base station, and wherein the first CU-UP functional part of the first base station is associated with a first IP address and the second CU-UP functional part of the second base station is associated with the first IP address.

5. A method performed by a network function that supports a plurality of central unit (CU)-user plane (UP) functional parts of a first base station, the method comprising:
   establishing a transport network layer, TNL, association with a (CU)-control plane (CP) functional part of the first base station;
   receiving from the (CU)-CP functional part of the first base station a request message for setting up an E1 interface, the request message comprising information for selecting a first (CU)-UP functional part among the plurality of (CU)-UP functional parts of the first base station, the plurality of CU-UP functional parts having a same Internet Protocol (IP) address, the information in the request message comprising at least an identifier of the first base station and a length of an identifier of the first base station;
   selecting the first (CU)-UP functional part of the first base station using the information identifying the first (CU)-UP functional part of the first base station; and
   transmitting, in response to the request message, a response message to the (CU)-CP functional part of the first base station, the response message comprising an identifier of the first (CU)-UP functional part of the first base station.

6. The method of claim 5, further comprising:
   obtaining the response message from the first CU-UP functional part of the first base station.

7. The method of claim 5, wherein the information for selecting the first CU-UP functional part of the first base station comprises one or more of: an identifier of the first CU-UP functional part of the first base station, or and a name of the CU-CP functional part of the first base station.

8. The method of claim 5, wherein the network function supports a second CU-UP functional part of a second base station, and wherein the first CU-UP functional part of the first base station is associated with a first Internet Protocol, IP, address and the second CU-UP functional part of the second base station is associated with the first IP address.

9. A method performed by a central unit (CU)-user plane (UP) functional part of a first base station, the method comprising:
   establishing a transport network layer (TNL) association with a network function that supports at least a first central unit (CU)-control plane (CP) functional part of the first base station;
   transmitting to the network function a request message for setting up an E1 interface and comprising information for identifying the first (CU)-CP functional part of the first base station, the information in the request message comprising at least an identifier of the first base station and a length of an identifier of the first base station; and
   receiving, in response to the request message, a response message transmitted by the network function, the response message comprising an identifier of the first (CU)-CP functional part of the first base station.

10. The method of claim 9, wherein
    the network function further supports a second (CU)-CP functional part of the first base station, or
    the network function further supports a (CU)-CP functional part of a second base station.

11. The method of claim 9, wherein the information for selecting the first (CU)-CP functional part of the first base station comprises an identifier of the first (CU)-UP functional part of the first base station.

12. The method of claim 9, wherein the network function supports a second (CU)-CP functional part of a second base station, and wherein the first (CU)-CP functional part of the first base station is associated with a first Internet Protocol (IP) address and the second (CU)-CP functional part of the second base station is associated with the first IP address.

13. A method performed by a network function that supports at least a first central unit (CU)-control plane (CP) functional part of a first base station, the method comprising:
    establishing a transport network layer (TNL) association with a central unit (CU)-user plane (UP) functional part of the first base station;
    receiving, a request message for setting up an E1 interface transmitted by the (CU)-UP functional part of the first base station, the request message comprising information for selecting the first (CU)-CP functional part of the first base station, the information in the request message comprising at least an identifier of the first base station and a length of an identifier of the first base station;
    selecting the first (CU)-CP functional part of the first base station using the information identifying the first (CU)-CP functional part of the first base station; and
    transmitting a response message to the (CU)-UP functional part of the first base station, the response message comprising an identifier of the first (CU)-CP functional part of the base station.

14. The method of claim 13, wherein the information for selecting the first (CU)-CP functional part of the first base station comprises an identifier of the (CU)-UP functional part of the first base station.

15. The method of claim 13, wherein the network function supports a second (CU)-CP functional part of a second base station, and wherein the first (CU)-CP functional part of the first base station is associated with a first Internet Protocol, IP, address and the second (CU)-CP functional part of the second base station is associated with the first IP address.

16. A non-transitory computer readable medium storing a computer program comprising instructions which when executed by processing circuitry causes the processing circuitry to perform the method of claim 1.

17. A non-transitory computer readable medium storing a computer program comprising instructions which when executed by processing circuitry causes the processing circuitry to perform the method of claim 5.

18. A non-transitory computer readable medium storing a computer program comprising instructions which when executed by processing circuitry causes the processing circuitry to perform the method of claim 9.

19. A non-transitory computer readable medium storing a computer program comprising instructions which when executed by processing circuitry causes the processing circuitry to perform the method of claim 13.

20. A network node comprising processing circuitry, the processing circuitry being adapted to implement a central unit (CU)-control plane (CP) functional part configured to:
establish a transport network layer, TNL, association with a network function that supports a plurality of central unit (CU)-user plane, UP, functional parts of the network node, the plurality of CU-UP functional parts having the same Internet Protocol (IP) address;
transmit to the network function a request message for setting up an E1 interface comprising information for selecting a first (CU)-UP functional part among the plurality of (CU)-UP functional parts, the plurality of CU-UP functional parts having a same Internet Protocol (IP) address, the information in the request message comprising at least an identifier of the network node and a length of an identifier of the network node; and
receive, in response to the request message, a response message transmitted by the network function, the response message comprising an identifier of the first (CU)-UP functional part.

21. The network node of claim 20, wherein the network function further supports a second (CU)-UP functional part of the network node, or the network function further supports a (CU)-UP functional part of a second network node.

22. The network node of claim 20, wherein the information for selecting the first (CU)-UP functional part of the network node comprises one or more of: an identifier of the first (CU)-UP functional part of the network node, or a name of the (CU)-CP functional part of the network node.

23. The network node of claim 20, wherein the network function supports a second (CU)-UP functional part of a second network node, and wherein the first (CU)-UP functional part of the network node is associated with a first IP address and the second (CU)-UP functional part of the second network node is associated with the first IP address.

24. A network node comprising processing circuitry, the processing circuitry being adapted to implement a network function that supports a plurality of central unit (CU)-user plane (UP) functional parts of the network node, the network function being configured to:
establish a transport network layer, TNL, association with a central unit (CU)-control plane (CP) functional part of the network node;
receiving from the (CU)-CP functional part of the network node a request message for setting up an E1 interface, the request message comprising information for selecting a first (CU)-UP functional part among the plurality of functional parts of the network node, the plurality of CU-UP functional parts having a same Internet Protocol (IP) address, the information in the request message comprising at least an identifier of the network node and a length of an identifier of the network node;
selecting the first (CU)-UP functional part of the network node using the information identifying the first (CU)-UP functional part of the network node; and
transmitting, in response to the request message, a response message to the (CU)-CP functional part of the network node, the response message comprising an identifier of the first (CU)-UP functional part of the network node.

25. The network node of claim 24, wherein the network function is configured to:
obtain the response message from the first (CU)-UP functional part of the network node.

26. The network node of claim 24, wherein the information for selecting the first (CU)-UP functional part of the network node comprises one or more of: an identifier of the first (CU)-UP functional part of the network node, or a name of the (CU)-CP functional part of the network node.

27. The network node of claim 24, wherein the network function is configured to support a second (CU)-UP functional part of a second network node, and wherein the first (CU)-UP functional part of the first network node is associated with a first Internet Protocol (IP) address and the second UP functional part of the second network node is associated with the first IP address.

28. A network node comprising processing circuitry, the processing circuitry being adapted to implement a central unit (CU)-user plane (UP) functional part configured to:
establish a transport network layer (TNL) association with a network function that supports at least a first central unit (CU)-control plane (CP) functional part of the network node;
transmit to the network function a request message for setting up an E1 interface comprising information for identifying the first control plane (CP) functional part of the network node, the information in the request message comprising at least an identifier of the network node and a length of an identifier of the network node; and,
receive, in response to the request message, a response message transmitted by the network function, the response message comprising an identifier of the first (CU)-CP functional part of the network node.

29. The network node of claim 28, wherein the network function further supports a second (CU)-CP functional part of the network node, or the network function further supports a (CU)-CP functional part of a second network node.

30. The network node of claim 28, wherein the information for selecting the first (CU)-CP functional part of the network node comprises an identifier of the first (CU)-UP functional part of the network node.

31. The network node of claim 28, wherein the network function supports a second (CU)-CP functional part of a second network node, and wherein the first (CU)-CP functional part of the network node is associated with a first Internet Protocol, IP, address and the second (CU)-CP functional part of the second network node is associated with the first IP address.

32. A network node comprising processing circuitry, the processing circuitry being adapted to implement a network function that supports at least a first central unit (CU)- control plane (CP) functional part of the network node, the network function being configured to:
- establish a transport network layer (TNL) association with a central unit (CU)-user plane (UP) functional part of the network node;
- receive, a request message for setting up an E1 interface transmitted by the UP functional part of the network node, wherein the request message comprising information for selecting the first (CU)-CP functional part of the network node, the information in the request message comprising at least an identifier of the network node and a length of an identifier of the network node;
- select the first (CU)-CP functional part of the network node using the information identifying the first (CU)-CP functional part of the network node; and
- transmit a response message to the (CU)-UP functional part of the network node, the response message comprising an identifier of the first (CU)-CP functional part of the network node.

33. The network node of claim 32, wherein the information for selecting the first (CU)-CP functional part of the network node comprises an identifier of the (CU)-UP functional part of the network node.

34. The network node of claim 32, wherein the network function supports a second (CU)-CP functional part of a second network node, and wherein the first (CU)-CP functional part of the first network node is associated with a first Internet Protocol, IP, address and the second (CU)-CP functional part of the second network node is associated with the first IP address.

* * * * *